(12) United States Patent
Perkov

(10) Patent No.: US 9,372,846 B1
(45) Date of Patent: Jun. 21, 2016

(54) METHOD FOR ABSTRACT SYNTAX TREE BUILDING FOR LARGE-SCALE DATA ANALYSIS

(71) Applicant: Dmitry Potapov, Moscow (RU)

(72) Inventor: Evgueni Perkov, San Mateo, CA (US)

(73) Assignee: Dmitry Potapov, Moscow (RU)

( * ) Notice: Subject to any disclaimer, the term of this patent is extended or adjusted under 35 U.S.C. 154(b) by 37 days.

(21) Appl. No.: 14/547,793

(22) Filed: Nov. 19, 2014

Related U.S. Application Data

(60) Provisional application No. 61/906,442, filed on Nov. 20, 2013.

(51) Int. Cl.
*G06F 17/27* (2006.01)

(52) U.S. Cl.
CPC .................................. *G06F 17/271* (2013.01)

(58) Field of Classification Search
CPC ... G06F 17/27; G06F 17/2705; G06F 17/271; G06F 17/274; G06F 17/30961
USPC .............. 704/1, 9, 10; 707/792, 797; 717/143
See application file for complete search history.

(56) References Cited

U.S. PATENT DOCUMENTS

| | | | | | |
|---|---|---|---|---|---|
| 5,095,432 | A * | 3/1992 | Reed | ..................... | G06F 17/271 704/9 |
| 5,321,606 | A * | 6/1994 | Kuruma | .................. | G06F 8/427 704/9 |
| 5,475,588 | A * | 12/1995 | Schabes | ................. | G06F 17/274 704/9 |
| 5,619,718 | A * | 4/1997 | Correa | .................. | G06F 17/274 704/9 |
| 5,649,215 | A * | 7/1997 | Itoh | ....................... | G06F 17/274 704/9 |
| 5,687,384 | A * | 11/1997 | Nagase | ................. | G06F 17/271 704/2 |
| 6,134,709 | A * | 10/2000 | Pratt | .................... | G06F 9/45512 717/143 |
| 6,138,098 | A * | 10/2000 | Shieber | ................. | G06F 17/271 704/257 |
| 6,782,505 | B1 * | 8/2004 | Miranker | ............ | G06F 17/2247 715/203 |
| 7,236,925 | B2 * | 6/2007 | Moore | ................ | G06F 17/2705 704/10 |
| 7,302,384 | B2 * | 11/2007 | Moore | ................ | G06F 17/2705 704/9 |
| 7,962,323 | B2 * | 6/2011 | Johnson | ................ | G06F 17/271 704/9 |
| 8,249,881 | B2 * | 8/2012 | Roy | ..................... | G10L 15/1822 704/200 |
| 8,311,806 | B2 * | 11/2012 | Bonnet | .................. | G06F 17/271 704/10 |
| 9,081,849 | B2 * | 7/2015 | Cushing | ............ | G06F 17/30392 |
| 2003/0074184 | A1 * | 4/2003 | Hayosh | ................. | G06F 17/271 704/1 |

(Continued)

OTHER PUBLICATIONS

"Earley parser", Wikipedia, downloaded Feb. 24, 2016, 10 Pages.*

(Continued)

*Primary Examiner* — Martin Lerner
(74) *Attorney, Agent, or Firm* — Bardmesser Law Group

(57) ABSTRACT

A method and computer program product for an abstract syntax tree (AST) builder for faster Earley parser. The algorithm for building an AST based on an amplified LRE (Left Recursive Earley parser) technique is provided. The proposed method constructs the AST during the recognition process. The proposed method preserves enough structural information during recognition phase that allows to avoid a mapping step and to eliminate the converter module. The LRE method is used in such a way that the AST processor can produce its output working directly with LRE data structures. This important feature leads to essential performance improvement of the entire parsing process.

14 Claims, 15 Drawing Sheets

(56) References Cited

U.S. PATENT DOCUMENTS

| | | | | |
|---|---|---|---|---|
| 2004/0243394 | A1* | 12/2004 | Kitamura | G06F 17/271 704/9 |
| 2006/0179086 | A1* | 8/2006 | Najork | G06F 17/30961 |
| 2009/0024385 | A1* | 1/2009 | Hirsch | G06F 17/2785 704/9 |
| 2011/0047185 | A1* | 2/2011 | Cho | G06F 17/30911 707/797 |

OTHER PUBLICATIONS

McLean et al., "A Faster Earley Parser", Proceedings 6th International Conference on Compiler Construction, Apr. 24-26, 1996, Lecture Notes in Computer Science, 1060, pp. 281 to 293.*

* cited by examiner

METHOD FOR ABSTRACT SYNTAX TREE BUILDING FOR LARGE-SCALE DATA ANALYSIS

CROSS-REFERENCE TO RELATED APPLICATIONS

The present application is a non-provisional of U.S. Provisional Patent Application No. 61/906,442, filed on Nov. 20, 2013, incorporated herein by reference in its entirety.

BACKGROUND OF THE INVENTION

1. Field of the Invention

The present invention relates to syntax analysis of text documents and, more specifically, to a method and computer program product for building an abstract syntax tree for a faster Earley parser.

2. Background Art

Parsers are computer programs that perform syntax analysis of text documents. Based on such analysis, the parsers are also capable of performing some useful operations on the documents, such as translating a document into a different language, extracting requested information from the documents, etc.

Parsers are typically built from a number of components (i.e., stages) that form a pipeline. The input document is processed by the parser components in a sequential order so that an output of a stage n becomes an input of a stage n+1. A typical set of components used in a general-purpose parser includes a lexical scanner (commonly referred to as a "lexer"), a grammar recognizer, and an abstract syntax tree (AST) builder.

Parsers have many applications in different branches of computing. They are essential parts of compilers and compiler generators, interpreters, data mining and artificial intelligence systems. Modern parsers have found their way into computational biology and genetics as well. What makes parsers so useful in many applications is their ability to detect and recognize an internal structure of a text. The meaning of a particular word can change radically depending on the word position within a sentence. A simple albeit not very practical example demonstrates this structural dependency:

1. Book that flight;
2. Order this book.

The two rather simple sequences have the same word (book) in a different position within the sentence. Both sentences have the same grammatical structure that can be described as follows:

Sentence: Verb Preposition Object

A kind of a formal description of an acceptable sentence structure above is referred to as a grammar in special literature on formal (or mathematical) linguistics. The point of the above simple example, however, is that depending on a position of the word "book" in that grammatical structure (Verb or Object) the entire meaning of this word changes. Assuming that the parser is a part of an automated translator from English to other languages, an ability of the system to translate would depend on its ability to successfully match the input sentence ("Book that flight") with one of the acceptable grammar structures (Verb Preposition Object).

When a sentence is submitted to the parser program, it first enters the lexical scanner (or a lexer). The lexer splits the input sentence into atomic pieces (i.e., words, lexemes) based on a set of rules defined (usually by a programmer) for a particular task. The lexer also determines which part of speech each lexeme belongs to. The output of the lexer is a sequence of pairs (part of speech, value) that preserves the original order of words in the input sentence. In the exemplary case above, the output produced by the lexer can be as follows: (Verb, book), (Preposition, that), (Object, flight).

The recognizer's task is to read the sequence that it received from the lexer and to determine if the input sentence ("book that flight") satisfies the grammar structure for the sentence. In other words, the input sentence is accepted by the grammar. If the input sentence is found to be grammatically correct, it is passed further to the next stage (a parse tree builder). Otherwise, the recognizer rejects the sentence and reports an error.

The tree builder produces a data structure that is equivalent to a tree that consists of nodes (grammatical categories) and edges (relations between the nodes). For the above example, the syntax tree is depicted in FIG. 1. Note that the industry standard parsers are unable to handle ambiguity inherent to an arbitrary context-free grammar. The syntax trees preserve both recognized structure and values of the input text. This makes it possible to translate the exemplary sentence to German as shown in FIG. 2. However, the words for "to book" and "a book" are different in German. Knowing the structure of the sentence allows for a correct translation of the second sentence (Order that book), as shown in FIG. 3.

Jay Earley proposed a method in his dissertation in 1970 that allows for recognizing texts that belong to very complex grammars approaching natural languages (as opposed to programming languages that have relatively simple grammatical structure). The Earley method combines a power to successfully recognize complex and often ambiguous sentences with processing speed. It is also relatively easy to implement. All this makes the Earley method an ideal candidate for text processing applications that deal with complex and unstructured (often human generated) textual data. The Earley parser is the Earley recognizer combined with an AST builder. Jay Earley himself proposed the original abstract syntax tree (AST) algorithm for this method. Construction of parse trees in the original Earley parser is done after the recognition is completed based on the information collected and retained by the recognizer.

As mentioned above, the Earley parsing method is powerful enough to successfully recognize texts that belong to any context-free grammar. However, the amount of run time processing consumed while recognizing an input text is rather large compared to less powerful, but faster table-driven methods. Different variations of Earley method that incorporated table-driven techniques while preserving parsing power of the original algorithm had been developed. One particular approach developed by McLean and Horspool is adopted as a foundation of the present invention. The authors named their method Left Recursive Earley (LRE). The LRE combines a method of states pre-computation that comes from LR parsers with the Earley recognizer.

The efficiency of the parser pipeline is determined by the least efficient stage. Therefore, finding a way to improve the efficiency of just one component can significantly increase the efficiency of the entire system. Typically, an AST builder takes longer time that the other stages.

Accordingly, there is a need in the art for a method for more efficient AST builder using a faster Earley parser technique.

SUMMARY OF THE INVENTION

The present invention relates to a method and computer program product for building an abstract syntax tree for faster Earley parser that substantially obviates one or more of the disadvantages of the conventional art.

In an exemplary embodiment of the present invention, there is provided a method and computer program product for building an abstract syntax tree (AST) for faster Earley parser. In one aspect of the invention, an algorithm for building an AST based on an amplified LRE technique is provided. Unlike the original AST builder proposed by Earley, the present method constructs the tree during the recognition process. This important feature leads to essential performance improvement of the entire parsing process.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the embodiments of the present invention, examples of which are illustrated in the accompanying drawings.

In an exemplary embodiment of the present invention, there is provided a method and computer program product for building an abstract syntax tree (AST) for faster Earley parser. In one aspect of the invention, an algorithm for building an AST based on an amplified LRE technique is provided. In order to turn a recognizer into a parser, a method for building a parse tree structure from the input text is required. The original Earley parser builds a special data structure that represents a threaded sequence of complete states. After the input has been processed, this data structure can be traversed to build a parse tree or to execute semantic action for a given parse.

The Left Recursive Earley (LRE) method encodes Earley states in terms of states that constitute an LR table for a given grammar. It is still possible to build a special data structure of the original Earley parser. In order to do that, a special function is required that maps the LRE state (an LRE state plus a set of pointers to previous LRE states) back to the equivalent Earley state. It is possible however, to avoid building this preliminary data structure and LRE states conversion take extra processing resources. Thus, the exemplary embodiment constructs the parse tree using information directly from the table of LRE states (LRE-table) implemented by the exemplary embodiment.

As noted earlier, an algorithm for building an AST based on an amplified LRE technique is provided. Unlike the original AST builder proposed by Earley, the present method constructs the tree during the recognition process. This important feature leads to a substantial performance improvement of the entire parsing process.

The following terminology is used in the invention:

Abstract Syntax Tree (AST) is a tree representation of an abstract syntactic structure of a sentence.

A tree is a connected graph with no cycles. A tree (as any other type of a graph) consists of nodes (vertices) and edges.

Figure 1:
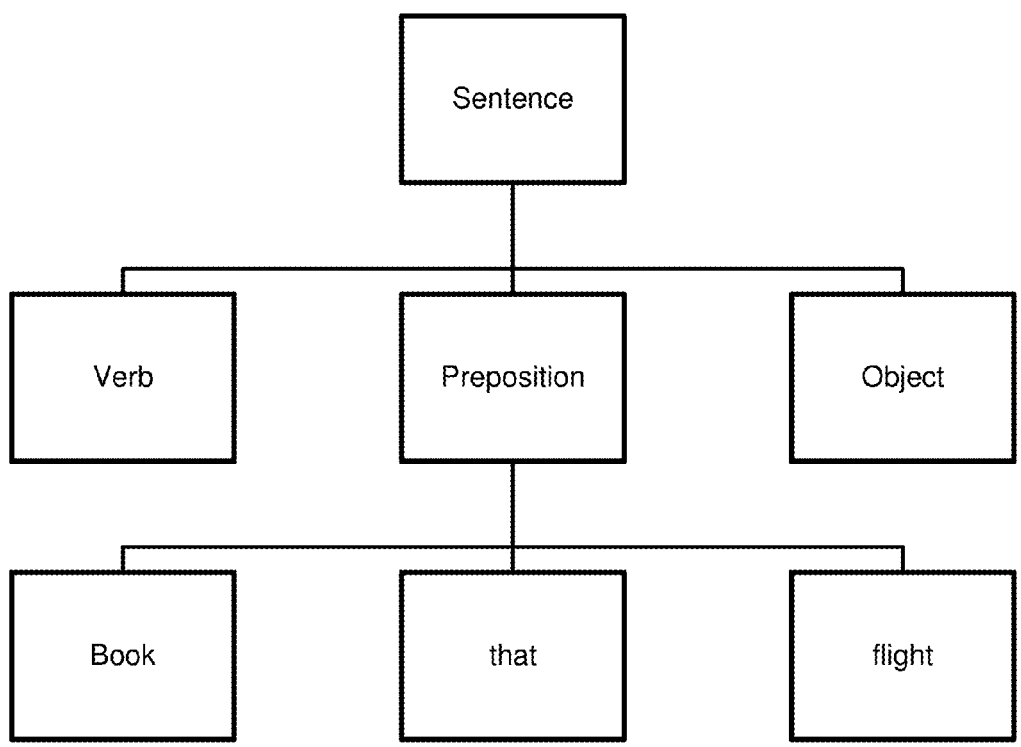
FIG. 1 illustrates a conventional syntax tree.
Figure 2:
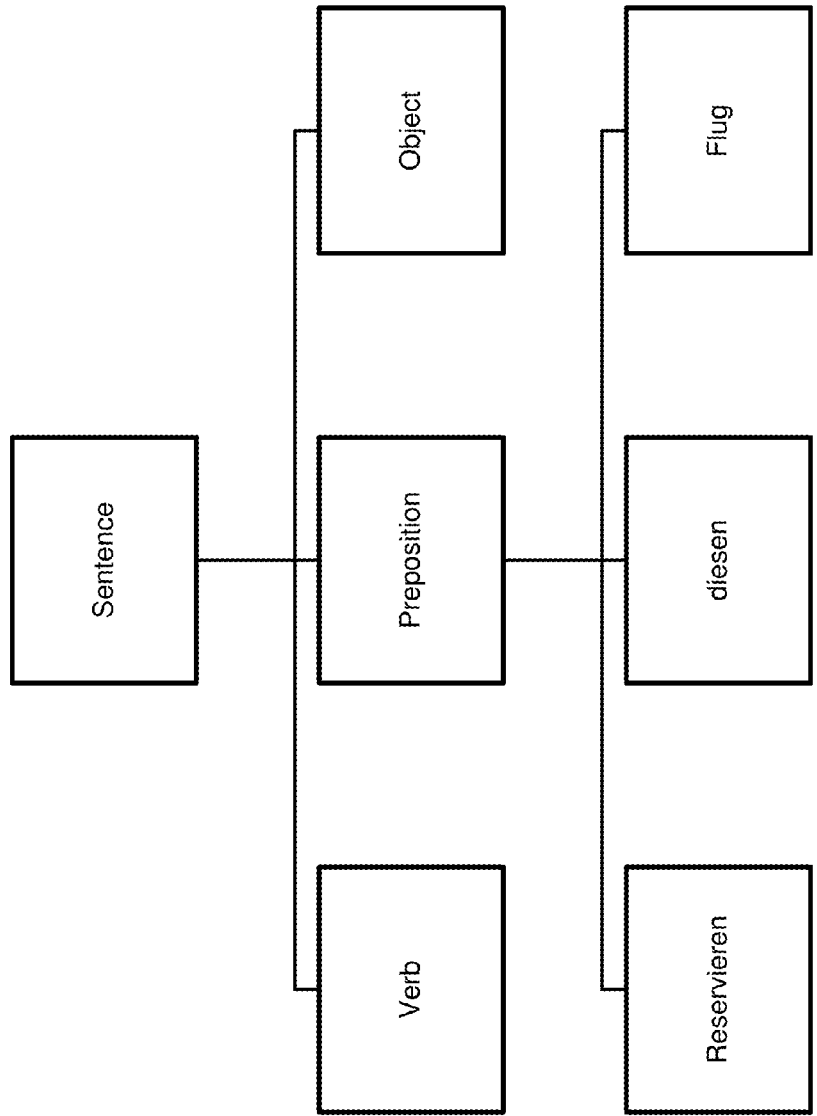
FIG. 2 illustrates a conventional syntax tree with a German translation.
Figure 3:
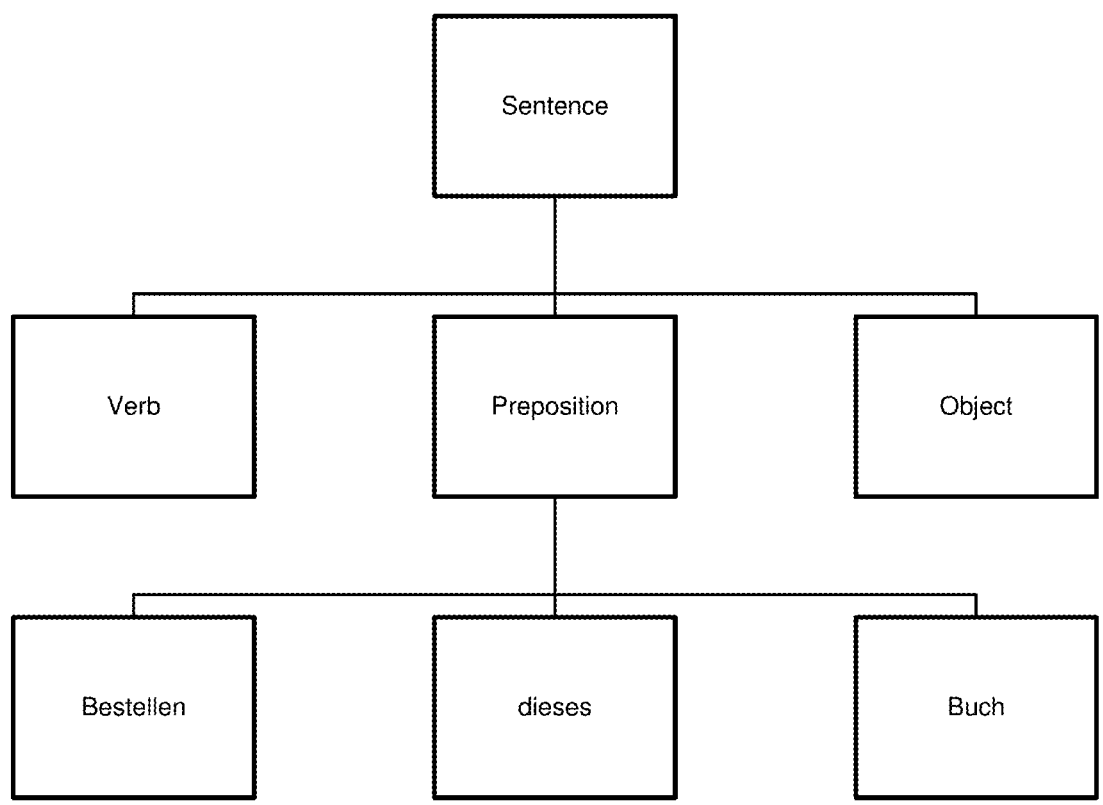
FIG. 3 illustrates a conventional syntax tree for another phrase translation into German.
Figure 4:
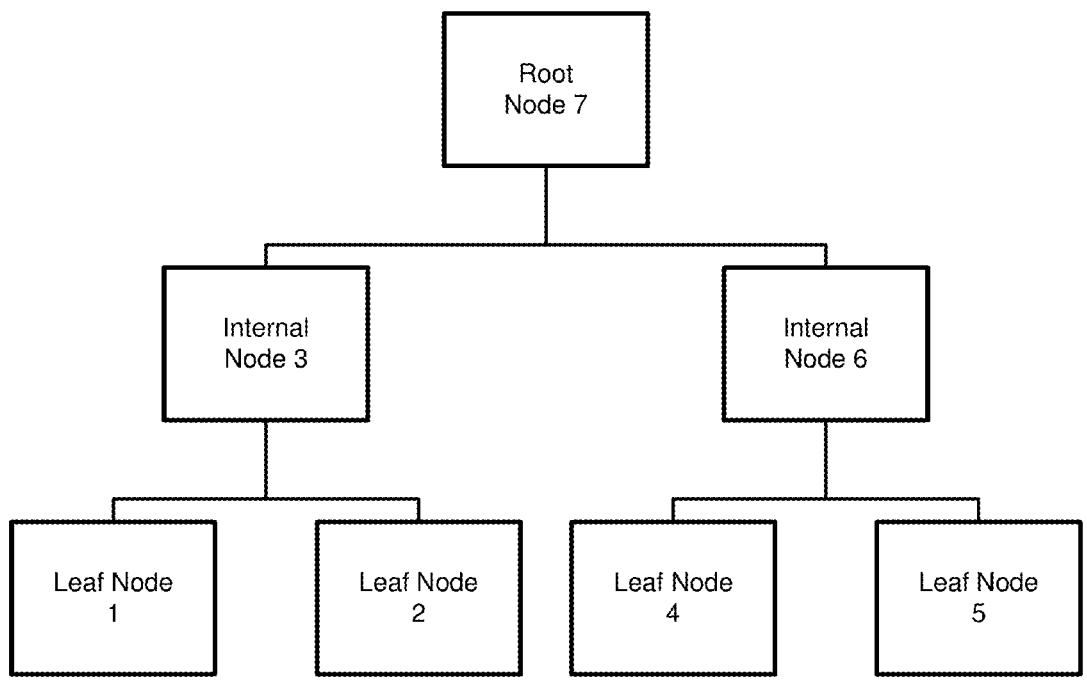
FIG. 4 illustrates an example of a rooted tree.

A tree is called a rooted tree if one vertex has been designated as the root, in which case the edges have a natural orientation, towards or away from the root. The root node has outgoing edges, but does not have the incoming ones. An abstract syntax tree is always a rooted tree. An example of a rooted tree is shown in FIG. 4.

An internal node has both incoming and outgoing edges. A leaf node has incoming edges and does not have the outgoing ones. A node k is called a parent of a node l, if k and 1 are connected by an edge and node k is closer to the root. Two nodes, i and j, are siblings if they have a common parent node. In the sample tree, the node 7 is a parent of the nodes 3 and 6. Nodes 3 and 6 are siblings and so are the nodes 1, 2 and nodes 4, 5.

The internal nodes represent grammatical categories in an abstract syntax tree (such as, a sentence, a verbal phrase, a verb, a noun phrase, an expression (in programming language, etc.) Leaf nodes represent values of concrete lexemes (book, that, plane, 1, 2, etc.)

A stack is a data structure that implements last-in-first-out (LIFO) policy. There are two operations defined for a stack: push (add element to the stack) and pop (extract an element from the stack). The last element that was added to the stack is the first element to be removed from the stack.

An LRE recognizer performs syntax analysis of a sentence based on a formal description of a grammar. The grammar description file is usually created by a programmer. Backus-Naur Form (BNF) is one of the most widely accepted formats used to describe the syntax of a language.

The LRE recognition process uses two primary operations: scan and recognize. The scan operation reads the next lexeme from the input string. The recognize operation analyzes the new lexeme in a context of an already processed text and partially recovered grammar structures (up to this point). The LRE recognizer stores the context in a form of so-called states. The number of states in a successful recognition equals the number of lexemes in the input text, so each state is assigned a number. The state number n corresponds to the $n^{th}$ lexeme that had been successfully recognized.

Each state consists of several elements. An element has two components: a non-negative number and a list of pointers to previous states. McLean and Horspool use the following notation for an element:

<number, [[list$_1$], . . . , [list$_n$]]>

For example:

<17, [[1, 2], [3], [3]]>

A number of the element can be used to recover full information about a grammatical category or a lexeme that was positively recognized when that element was generated.

Each element can be either complete or incomplete. The definition of either is not necessary to describe the exemplary method of AST tree building. It is sufficient to point out that the LRE algorithm is able to determine a type of an element.

The following notation is used for the state:

{element$_1$, element$_2$, . . . , element$_n$}

For example

{<17, [[1, 2], [3], [3]]>, <23, [[2]]>}

Operations scan and recognize always work in pair and produce the next state. These two operations are called one after another until the entire input is consumed or until an error is encountered. All produced states are placed (in order of production) into a table called a state set. The following Table 1 shows an example of state set produced for a simple string of 5 lexemes:

| State # | State |
|---|---|
| 0 | {<0, [[0], [0], [0], [0]]> |
| 1 | {<3, [[0]]> <2, [[0]]> <1, [[0], [0], [1]]>} |
| 2 | {<5, [[1]]> <4, [[0], [2]]>} |
| 3 | {<3, [[2]]> <6, [[0]]> <1, [[0], [0], [3]]>} |
| 4 | {<5, [[3]]> <4, [[0], [4]]>} |
| 5 | {<3, [[4]]> <6, [[0]]> <1, [[0], [0], [5]]>} |

Once the entire input is read in and the state set table is built, the recognizer checks if the last state contains an accepting element. The string is recognized successfully, if such element is present. The accepting element in this example is <1, [[0], [0], [5]]> in state 5.

The input table itself is obtained as a result of some modifications of original LRE algorithm. The special structure of the table allows to build the parse tree by checking some relations between the input item and the previous considered item (so the overall complexity of the method is O(n), where n is the size of an input text in words (lexemes)).

The exemplary method of building a tree structure can be demonstrated by using the above table.

Let I={[i,j,k,l]}; i,j,k,l∈N be a set of all items

Define a relation parent (item$_1$, item$_2$) on a set I$^2$=I×I as follows:

parent (item$_1$, item$_2$): item$_1$.index>item$_2$.index ^
item$_1$.origin<item$_2$.origin ^
item$_1$.endmarker==item$_2$.endmarker parent (item$_1$, item$_2$)==true means that the item$_1$ is a parent of the item$_2$.

Define a relation sibling (item$_1$), item$_2$) on a set I$^2$=I×I as follows:

sibling (item$_1$, item$_2$): item$_1$.index≤item$_2$.index ^
item$_1$.endmarker==item$_2$.origin ^
item$_1$.endmarker<item$_2$.endmarker sibling (item$_1$, item$_2$)==true means that item$_2$ is a right sibling of item$_2$.

The exemplary embodiment uses an auxiliary structure that implements a stack policy (last-in-first-out) to accumulate siblings while waiting for their parent to show up eventually. The process goes through the table left to right and top down checking the current input symbol and the last processed one for being in either parent or sibling relation. The last processed item is located on top of the stack. If the new item appears to be the sibling of the item on top of the stack, then it is pushed onto the stack. If, on the contrary, the incoming item is a parent of the item on top of the stack, then all the items are currently on the stack. A number of children stored on the stack is defined by the following formula:

number_of_children_on_stack≤parent.endmarker−parent.origin

According to the exemplary embodiment, a method for building a tree structure is implemented as follows:

Input: a table of items stored as a two-dimensional array table [i, j].
Output: a tree structure tree.
BEGIN
for i in 0 . . . rows (table)−1
row:=table [i]
for j in 0 . . . size (row)−1
current_item:=row[j]
prev_item:=stack.top
if sibling (prev_item, current_item) then
node:=Node.new (current_item)
stack.push (node)
else if parent (current_item, prev_item) then
num:=current_item.endmarker−current_item.origin
node:=Node.new (current_item)
num.times do
node.children.push (stack.pop)
    end
end if
end for
end for
tree=Tree.new (stack.pop)
return tree
END Due to the nature of an algorithm that builds the input table, the sibling that comes later will always be the right sibling of the previous item. With the minor changes the same method can be used to execute the semantic actions associated with the grammar rules without building the actual parse tree. For the sibling nodes the process executes a semantic action and pushes the result onto the stack. For the parent node the process executes its semantic action using values of all its children stored on the stack and, then, pushes the parent's computed value back onto the stack.

According to the exemplary embodiment, a method for building AST for LRE is provided. The following facts make the exemplary method possible:

1. Abstract syntax tree nodes are built from complete elements only. Information carried by each complete element is sufficient to recover a corresponding grammar category or a lexeme;

2. LRE algorithm has implicit knowledge which elements are complete and which are not;

3. LRE algorithm produces complete elements in a specific order. That order makes it possible to decide whether the current element represents a parent or a sibling of a node that was built at the previous step. This previous node (and its siblings) is temporarily stored in a stack.

The method, in accordance with the exemplary embodiment, is based on three non-negative integers with the values derived from a particular state and an element. These numbers are called index, origin, and marker. The meaning of all three numbers can be illustrated by a simple example. A grammar G for the example is as follows:

E::=E
E::=E OP T
E::=T
T::='Id'
OP::='+'
OP::='−'

This is a sample grammar description in standard BNF notation. The left hand side of each expression above represents some syntactic structure in the language used. The right hand side of each expression shows the structure that the left hand side expands into. There may be more than one RHS representation of a particular LHS. For example, LHS E has two different RHSs—E::=E OP T and E::=T.

The RHS, typically, consists of strings of both non-terminal symbols (symbols that represent structures) and terminals (symbols that represent some literals, such as letters, digits, keywords, etc.) Rules T::='Id', OP::='+', and OP::='−' above contain just single terminals in their right hand sides. The examples of strings that are accepted by the grammar above are: 'Id', 'Id+Id', 'Id+Id−Id', 'Id+Id+Id, etc.

Let us further assume that the following input string is being parsed and the processing of the second "Id" in this string (the third lexeme) has just been finished.

'Id+Id-+Id'

Both the original Earley algorithm and its LRE variant make use of a marker (shown as a little symbol to the right of the middle "Id" above). This marker points to the position in the input string. Everything to the left of the marker has been processed, and the remaining portion is yet to be processed. At the beginning of execution of the algorithm, the marker is placed to the left of the first lexeme and its value is set to 0.

After scanning the first lexeme, the marker is moved over by one lexeme to the right and its value is incremented by one. Upon successful recognition of the entire input string, the marker is located right after the last lexeme and its value is equal to n, where n is the number of lexemes (words) in that input string. In the example above, the marker's value is set to 3, because the process has just finished processing the third lexeme.

An origin is another position in the input text and it always precedes the marker in the text. Note that there are as many origins as a number of grammatical categories that the process is trying to recognize at the moment. For example, the third lexeme "Id" that has been just processed corresponds to the grammatical category T (as can be seen in the BNF scheme for the grammar above). It is clear that the process began recognizing this category T one position to the left from the marker so the origin for this particular instance of T equals to 2. At the same time the entire value "Id+Id" to the left of the marker corresponds to the grammatical category E that the process began recognizing from the position 0 in the input string. Thus, for that instance of E the origin is 0. The LRE state generated when the marker was shifted to the position #3 in this example is as follows:

3 [<3, [[2]]><6, [[0]]><1, [[0],[0],[3]]>}

This state's number is 3 and it has three elements, all three of them are complete. The origin of the first element is found as a value 2 in the pointers list. The origin of the second element equals to 0 and it is also found in the list of pointers for that element. The third integer is an index. The index is an ordinal number of an element in a state counting from 0. The index of <3, [[2]]> equals 0 and the index of <6, [[0]]> equals 1. Note that the conventional scheme does not have the third element-index. Thus, it has no means for determining the relationship between the AST nodes in run time. Introduction of an index and utilization of state number, origin, and index in parent( ) and sibling( ) relation is an important part of the exemplary embodiment.

According to the exemplary embodiment, an index, an origin, and a marker can be used to determine relationship between two nodes, the current node and the previous one that is stored temporarily at the top of the stack structure. The $node_1$ is a parent of the $node_2$ in the AST if:
1. Index of the $node_1$ is greater than index of the $node_2$ and
2. Origin of the $node_1$ is less than or equal to origin of the $node_2$ and
3. Marker of the $node_1$ is greater than or equal to marker of the $node_2$ The $node_1$ is a right sibling of the $node_2$ in AST if:
1. Index of the $node_2$ is less than or equal to index of the $node_1$ and
2. Marker of the $node_2$ is equal to origin of the $node_1$ and
3. Marker of $node_2$ is less than marker of $node_1$ According to the exemplary embodiment, the AST building procedure is implemented as follows.

All complete elements are extracted from the latest LRE state produced by the LRE recognizer process and the order of the elements within the state is preserved;

If the extracted elements contain accepting element, and if there are more lexemes in the input string, then accepting element is discarded;

The next element from the list is taken and relations parent and sibling between this element and the element which is currently on top of the stack are computed. If the stack is empty, then the element is just pushed onto the stack.

If the next element is a right sibling of the element on top of the stack, then the next element is pushed onto the stack;

If the next element is a parent of the element on top of the stack, then it is also the parent of all elements that are currently in the stack. The elements (marker-origin) are extracted from the stack and added as children of the next element. Then, this element is pushed onto the stack;

The process repeats steps above until there are no more lexemes left in the input. If the recognizer accepts the input string, then the last element will be an accepting element. The accepting element becomes a root of the AST. The method of the exemplary embodiment builds the tree simultaneously with the recognition process unlike the conventional method, which performs the recognition first and then builds the AST based on data collected during the recognition. The exemplary process uses information about local relationships between two adjacent elements for constructing a global object (AST) by the end of the recognition process.

The procedure execution can be illustrated using the state set from Table 1.

The state #0 has no complete elements;

The state #1 has 3 complete elements: <3, [[0]]>, <2, [[0]]>, and <1, [[0], [0], [1]]>. The third state, however, is accepting. Therefore the state is discarded, because reading of the input is not yet finished.

The stack is initially empty, so the process pushes <3, [[0]]> onto the stack:

| AST | Stack |
| --- | --- |
| <3, [[0]]> | <3, [[0]]> |

The next element <2, [[0]]> is a parent of <3, [[0]]>. The process extracts <3, [[0]]> from the stack, adds it as a child of <2, [[0]]> and pushes <2, [[0]]> onto the stack:

| AST | Stack |
|---|---|
| <2, [[0]]> | <2, [[0]]> |
| <3, [[0]]> | |

The process has exhausted the list of complete elements of the state #1. The next iteration of the scan and recognizer operations produce the state #2. The list of complete elements for this state has just one element: <5, [[1]]>. This element happens to be a sibling of <2, [[0]]> so it is pushed onto the stack.

| AST | Stack |
|---|---|
| <2, [[0]]> | <5, [[1]]> |
| <3, [[0]]> | <2, [[0]]> |

The process has exhausted the list of complete elements of the state #2. The next state #3 has 3 elements, all of them are complete, but the last one (<1, [[0], [0], [3]]>) is accepting so it is ignored. The element <3, [[2]]> is a sibling of <5, [[1]]> so it goes on top of the stack:

| AST | Stack |
|---|---|
| <2, [[0]]> | <3, [[2]]> |
| <3, [[0]]> | <5, [[1]]> |
| | <2, [[0]]> |

Figure 5:
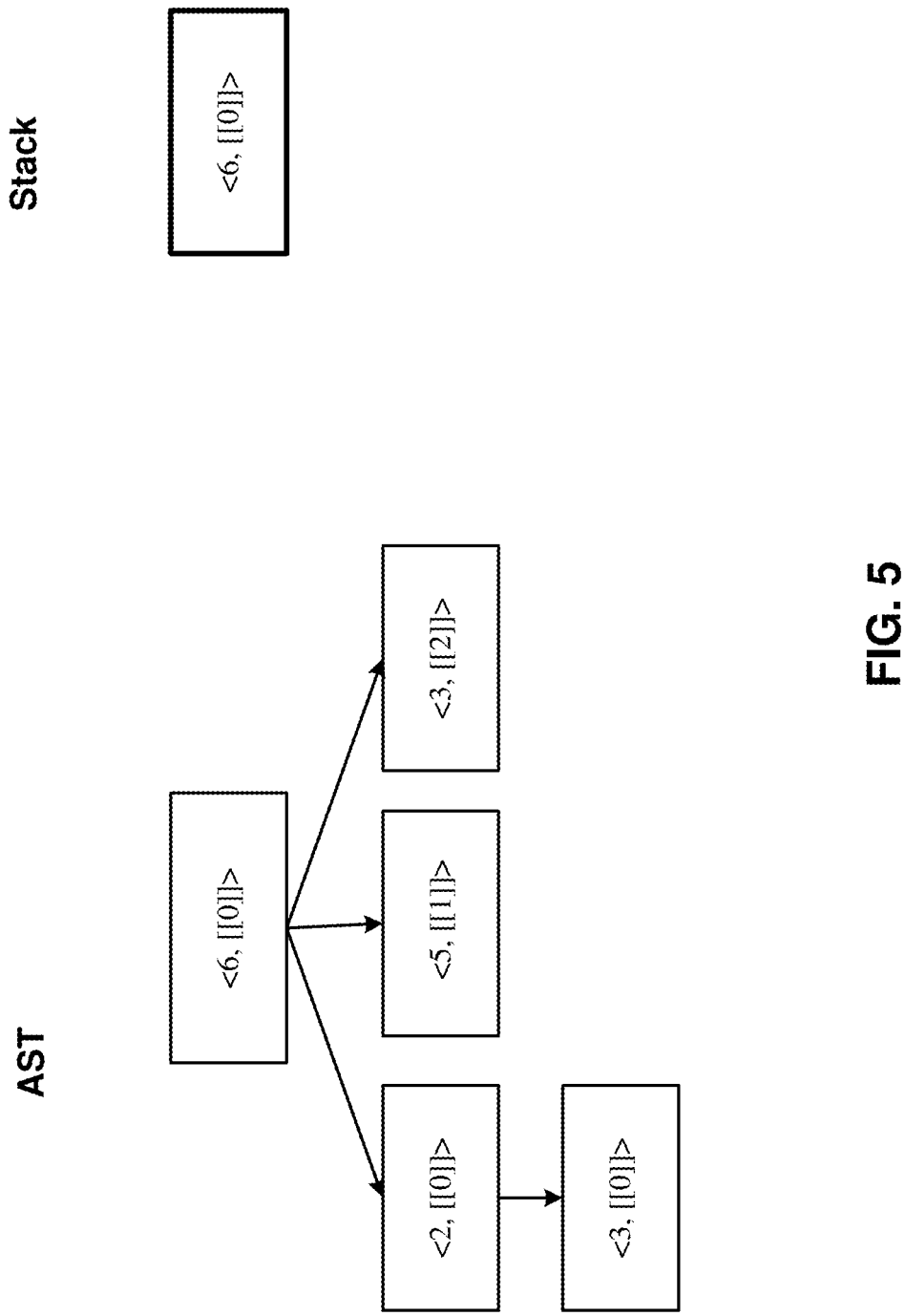
FIG. 5 illustrates that the process extracts all three elements from the stack and adds them as children.

The next complete element, <6, [[0]]> is a parent of <3, [[2]]> (and therefore of all elements that are currently in stack). The process extracts all three elements from the stack and adds them as children of <6, [[0]]> as shown in FIG. 5.

Figure 6:
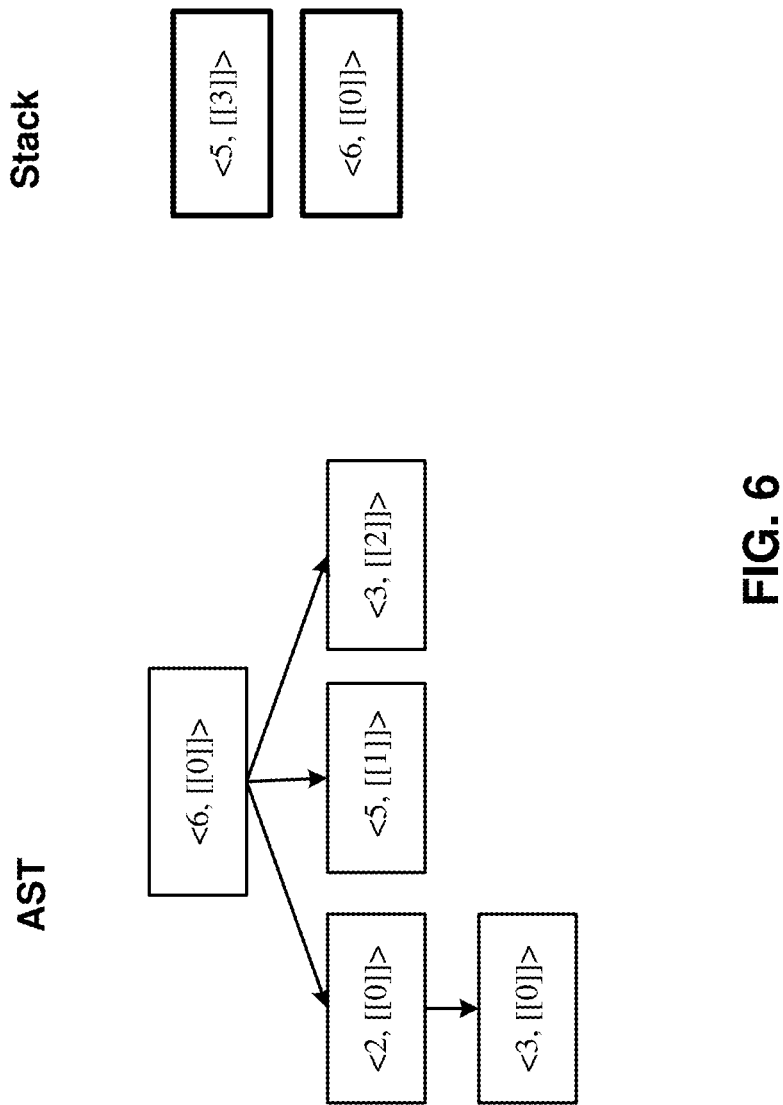
FIG. 6 illustrates a sibling tree element.

The next state #4 has just one complete element <5, [[3]]>. This element is a sibling of <6, [[0]]> as shown in FIG. 6.

Figure 7:
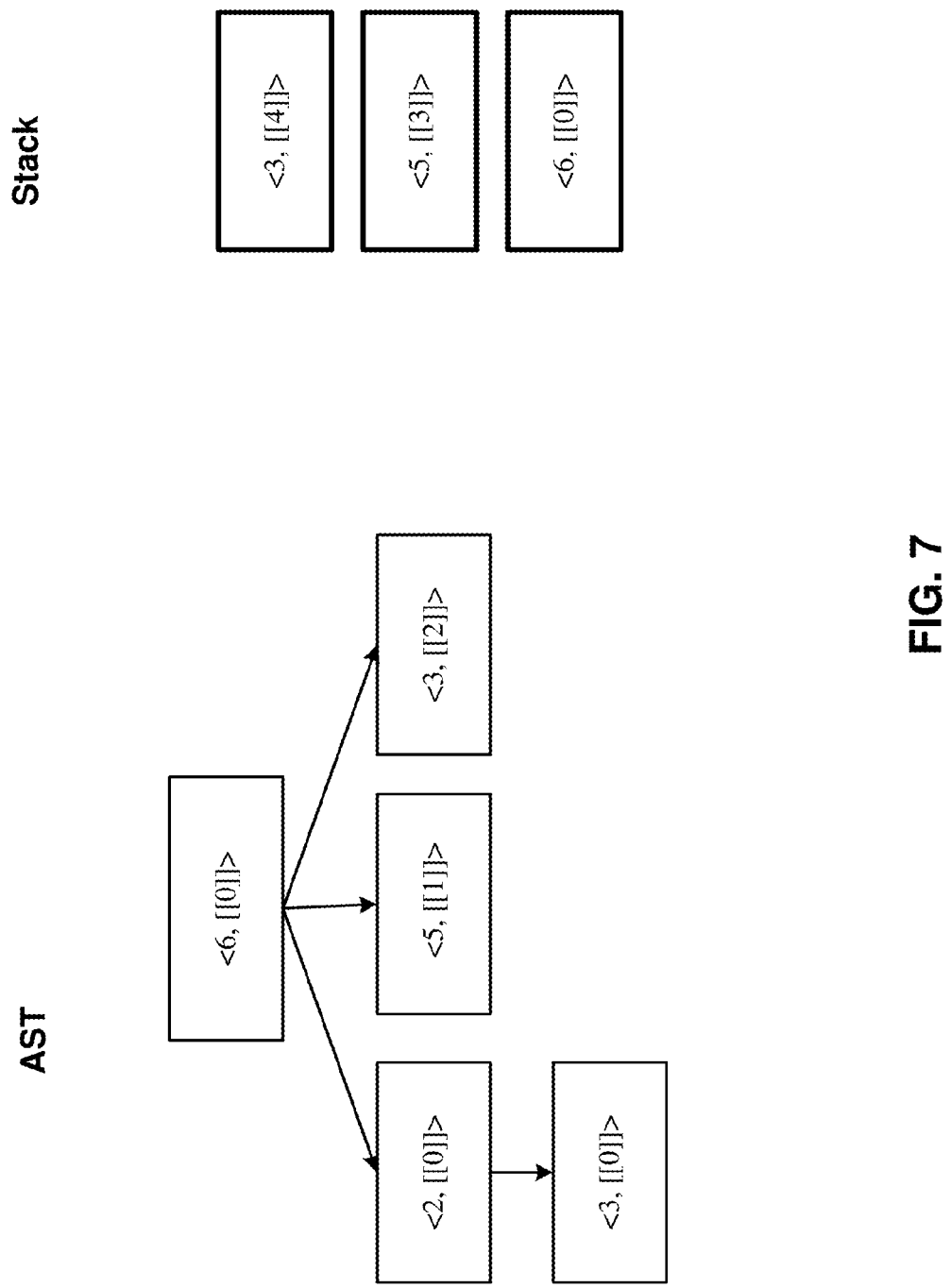
FIG. 7 illustrates that the sibling element is pushed onto the stack.
Figure 8:
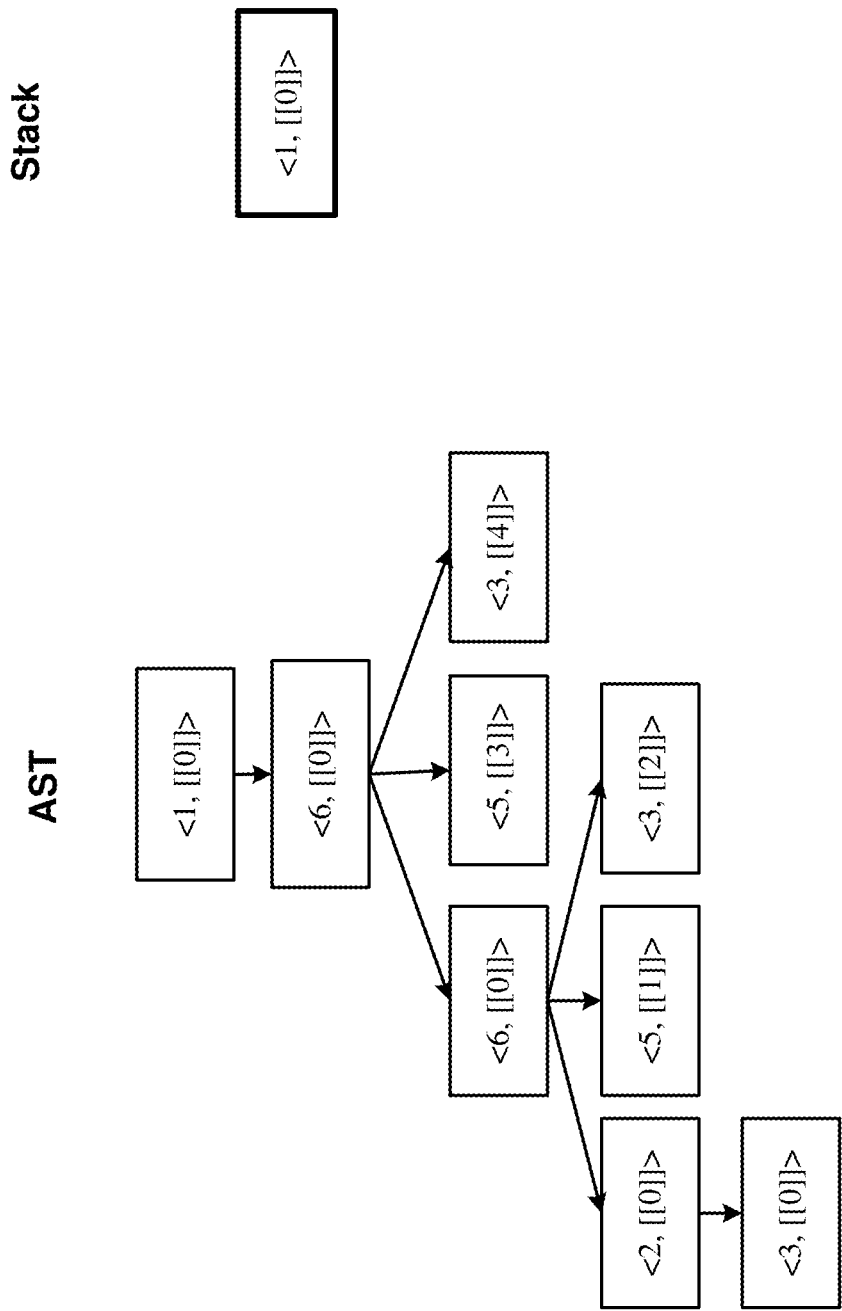
FIG. 8 illustrates a parent element.

The next and final state #5 has 3 complete elements; the last one being the accepting element. The entire input string is consumed by now so the accepting element will not be discarded at this time. The element <3, [[4]]> is a sibling of <5, [[3]]> so it is pushed onto the stack as shown in FIG. 7. The element <6, [[0]]> is a parent of <3, [[4]]> as shown in FIG. 8.

According to the exemplary embodiment, the proposed method is an integral part of the faster Left Earley parser (LRE). Therefore, its practical applications are the same as those of the parser itself. As mentioned above, the Earley recognizer is capable of parsing general context-free grammars including complex, ambiguous and vaguely structured documents. Its faster version, LRE, improves its performance up to the level that makes it suitable for practical applications. The proposed addition to LRE improves performance further without adding to the method complexity. The addition to the LRE is: 1) the third number—index and 2) two methods—parent( ) and sibling( ). These components allow to determine AST nodes relationship as soon as the next grammar structure is successfully recognized (i.e., during parse time, rather than after parsing completion).

One of the most promising applications of powerful parsers lies in the field of performance analysis of complex software systems. Modern enterprise-level systems include hundreds, if not thousands, of components deployed over dozens of powerful computers. These components are often produced by different vendors and made to work together by system integration companies or technical consulting firms. One of the most serious problems with such large and complex systems is performance. Once fast and reliable, a system may suddenly, and without obvious cause, become slow and unstable. Quite often, it is nearly impossible to determine the root cause of the problem within a time period provided by a Service Level Agreement.

In most cases, each single component of the system leaves records of its health in log files. The difficulty, however, is in finding and analyzing the right log or set of log files. Furthermore, the indication of a problem may not be obvious even if the correct logs are found. In many cases, some statistical and correlation analysis of the log data are necessary. The parser with the added AST builder allows for parsing multiple log files written in totally different formats. The recognizer restores a grammatical order in a text and AST builder puts it in an easy-to-manipulate tree structure. All potentially interesting data (performance numbers, diagnostic messages, etc.) becomes immediately available for extraction. The extracted data is uploaded into a structured storage (database), where it can be quickly and efficiently analyzed.

An example of the log records are provided in the appendix i. Note that the log records are shown together for simplicity. In reality, the log records are spread over the entire log file. The parser fetches a time stamp of each message, its severity, message ID, and the message itself. Every log entry is basically a record of an event—an error, a start or a completion of a particular operation, a reception of an incoming network message, etc. All these events are interconnected and some or all of them provide invaluable diagnostic information about a particular component or the entire system.

The problem is that these messages could be located in different places in the same log file or even in different log files on different computers and still be related to each other. In order to mine such deeply hidden relationships, a method of parsing such log files is used. The parsing includes methods for separating interesting records from the irrelevant ones. That is why the parsing method of Earley is used. However, performance of parsing is important because hundreds of gigabytes and even terabytes of text data might need to be parsed. Without the performance improvements implemented by the exemplary embodiment, a single file parse may take several hours rather than minutes or seconds. The messages are very different, and their grammar is fairly close to the natural human language. That is where the power of the modified Earley method becomes useful.

All of the interesting data are extracted and loaded into a database. A grammar description in extended BNF notation allows for pointing out explicitly which data to extract during the parse process and which data is to be skipped. In one example, a particular software thread (see Appendix i) is executed for 20 seconds, the SQL query takes 6 seconds between sending it to the database and receiving the first row from the database. The cache build time took 14 seconds and the size of that cache was 3,191,465 records.

The performance and stability of the system depends on values of these parameters (i.e., on the actual numbers that are extracted from the log files during parsing). The names of these parameters and their values will tell the subject area expert what potential performance problem with this software may be found and where to look for problems. Once stored in the database, the data can be quickly and efficiently presented to the performance expert who would not have to spend many hours sifting through dozens of log files.

The proposed method had been integrated into a performance analysis system for Oracle Business Intelligence applications. Oracle BI Applications Suite uses the following software components in its technology stack:

Oracle database management system;

Informatica Integration Services or Oracle Data Integrator as ETL tool;

Data Warehouse Administration Console (DAC), ETL orchestration tool;

Oracle BI Server Enterprise Edition.

These software modules generate a lot of diagnostic information that is stored in a log and trace files of different formats similar to the format shown in Appendix i. The exemplary embodiment applies to any kind of activity that is designated by the following terms that are widely accepted in Knowledge Engineering industry: Process Mining, Business Activity Monitoring, Business Process Management, Workflow Management Systems, Logs Mining. The parser extracts interesting and important performance numbers using grammar description files—one file per a distinct log format. The extracted data is stored in the database.

Figure 9:
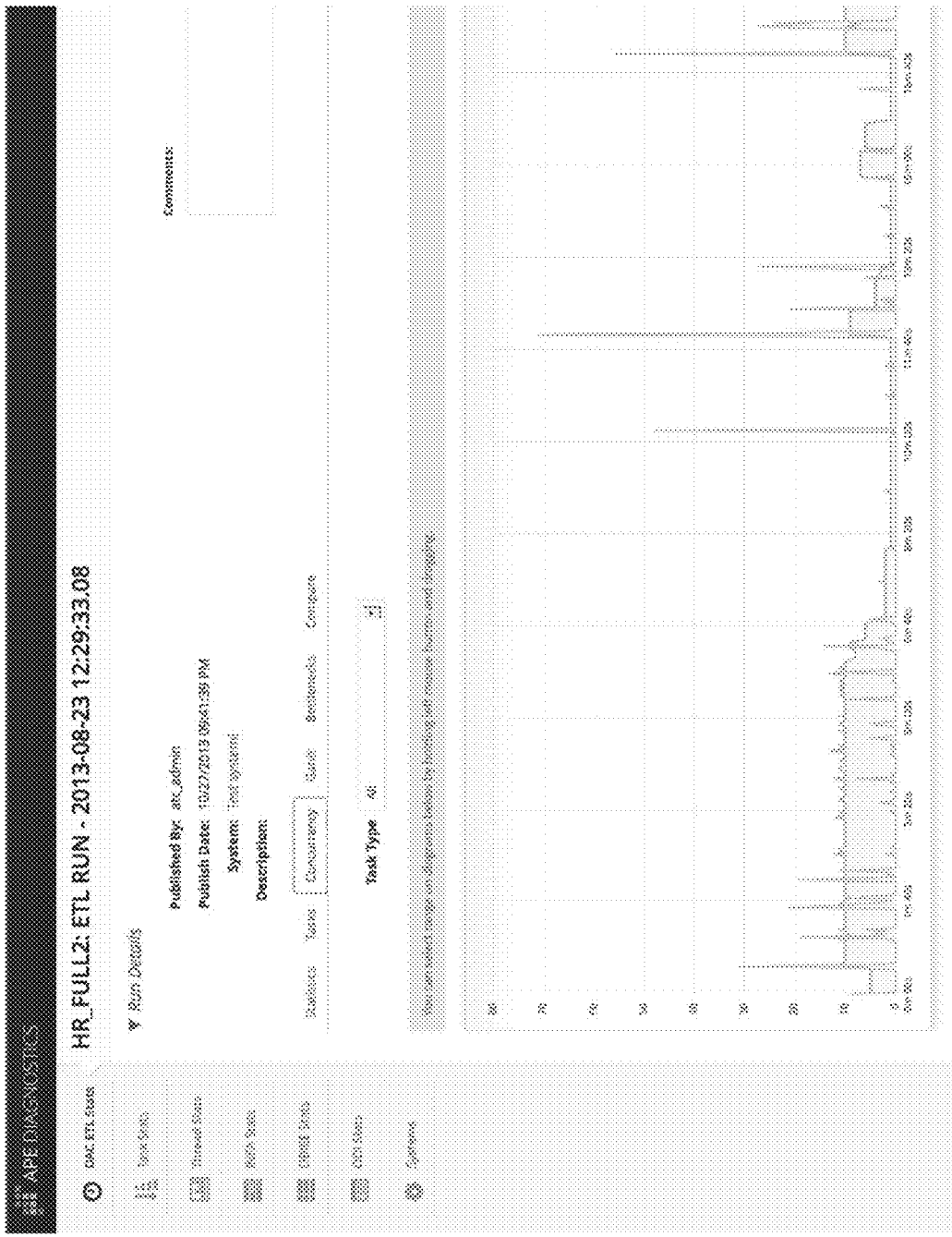
FIG. 9 illustrates an ETL run concurrency chart.
Figure 10:
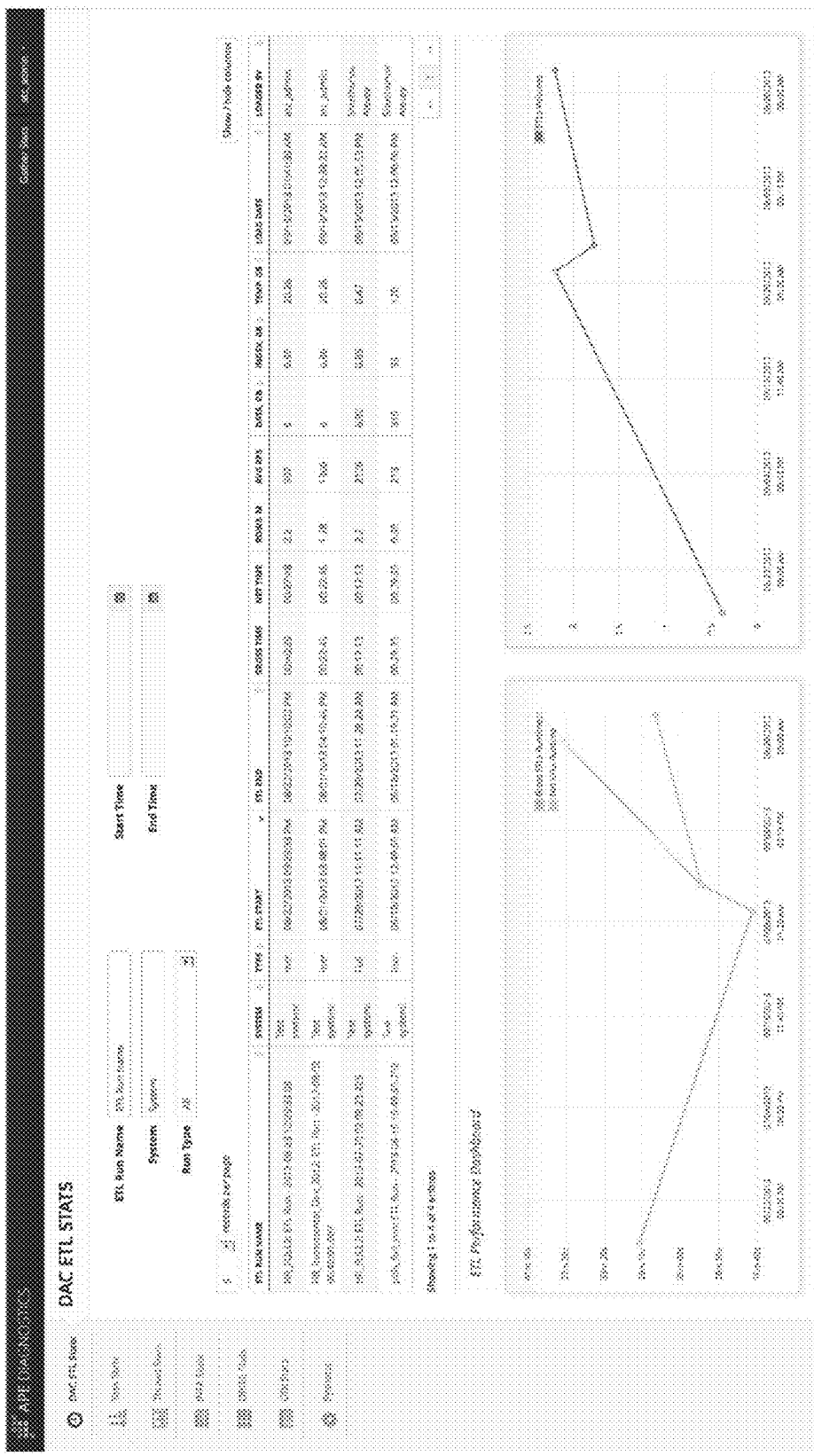
FIG. 10 illustrates a top level view screen shot.
Figure 11:
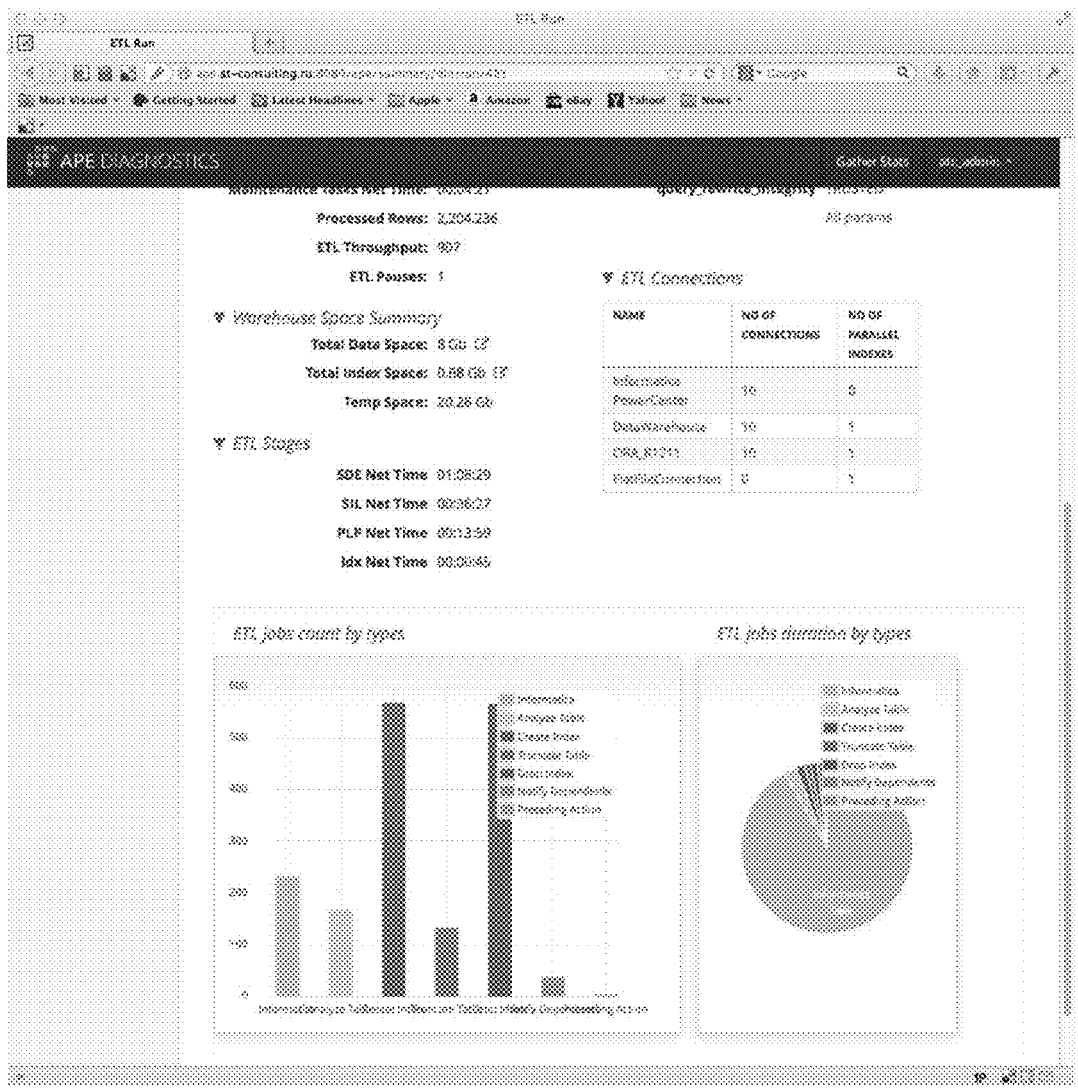
FIG. 11 illustrates an ETL run summary view screen shot.

The system presentation layer of the exemplary embodiment displays the data in a tabular form or as charts. The screen shots are shown in FIGS. 9-11. FIG. 9 illustrates an ETL run concurrency chart. FIG. 10 illustrates a top level view screen. FIG. 11 illustrates an ETL run summary view. The ETL is an acronym that is accepted as a standard and is widely used in Business Intelligence and Data Warehousing. It stands for Extract, Transform, and Load data from the operational transactional databases into data warehouse databases that support business analytics applications. A performance expert can extract a lot of useful visual information by looking at these charts—e.g., concurrency of ETL jobs (number of parallel ETL processes that may directly affect performance of the entire ETL process, if there are too many of them), etc. The charts are produced by the core backend system that uses the exemplary embodiment method.

The parsers are built from a number of components (i.e., stages) that form a pipeline. The input document gets processed by these components in a sequential order so that an output of stage n becomes an input of stage n+1. Efficiency of the entire pipeline is determined by the least efficient stage. The proposed method improves the efficiency of one stage of the parsing pipeline by eliminating extra conversion steps and shifting other steps into a previous stage.

Figure 12:
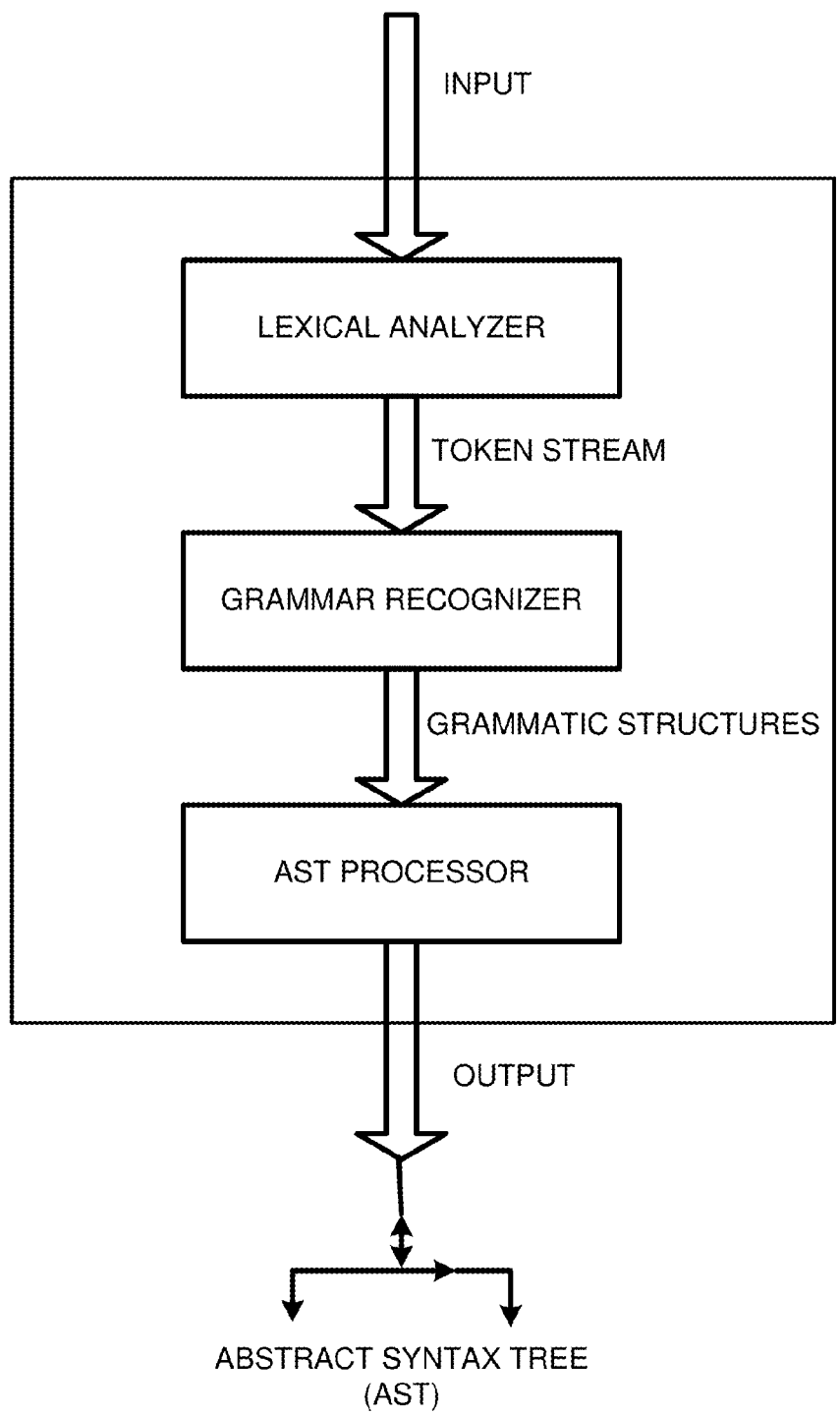
FIG. 12 illustrates a conventional parser module, which has a pipeline that consists of the three stages.

A conventional parser module has a pipeline that consists of the following stages as shown in FIG. 12:

Lexical Analyzer;

Grammar Recognizer; and

Abstract Syntax Tree (AST) Processor.

According to the exemplary embodiment, the parser employs a powerful algorithm proposed by J. Earley. This algorithm successfully handles a wide range of input text formats including documents written in natural languages. For efficiency reasons, the exemplary embodiment uses one particular implementation of the Earley algorithm called LRE.

Figure 13:
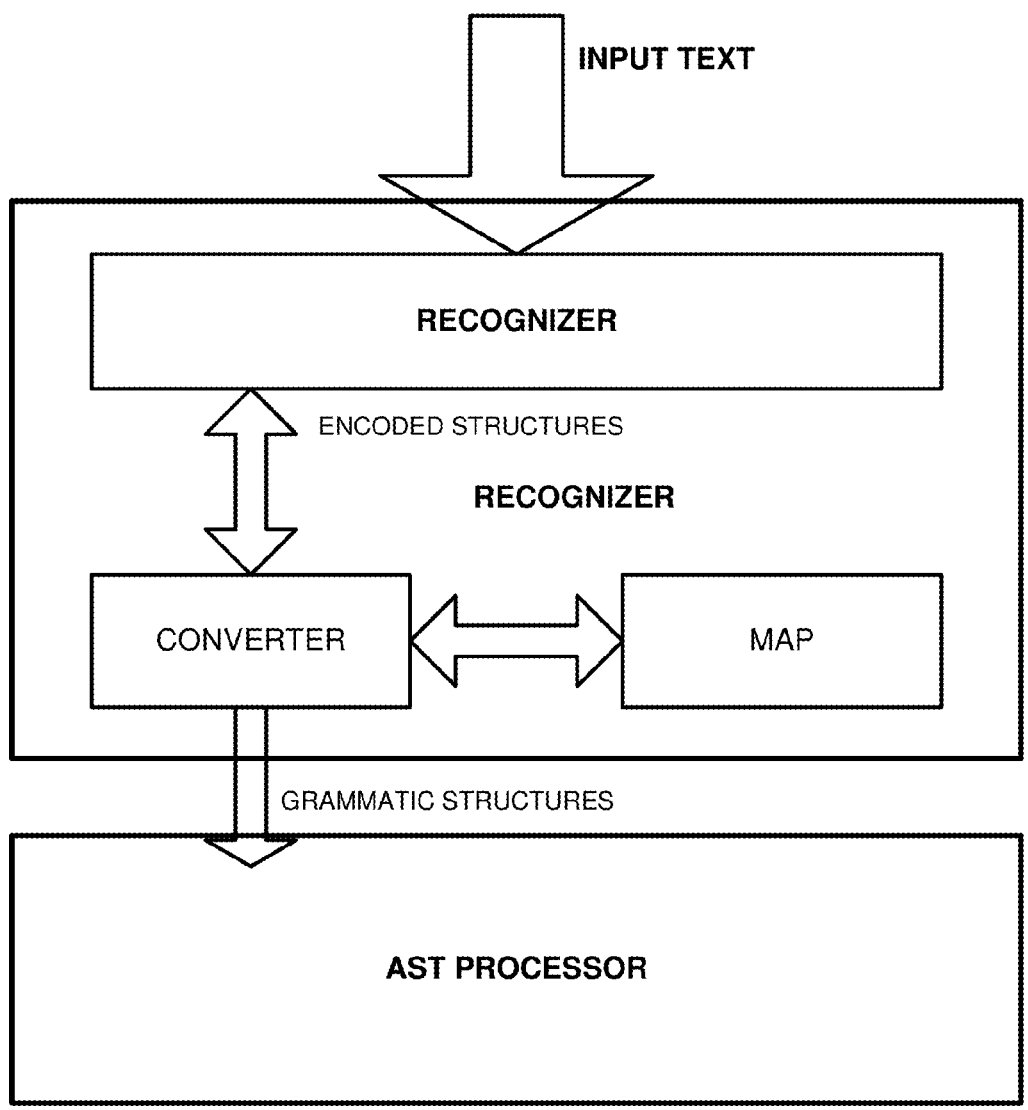
FIG. 13 illustrates a conventional converter module using a special map.

In this implementation, all data structures used in parsing are pre-computed in advance and stored permanently for use in all future parses. This optimization delivers much better performance than the original Earley method. However, a downside of this optimization is that it introduces an extra level of data abstraction. Before the AST processor can use grammatical primitives, they have to be mapped to the original grammar. A converter module performs this task with a help of a special map, as shown in FIG. 13.

Figure 14:
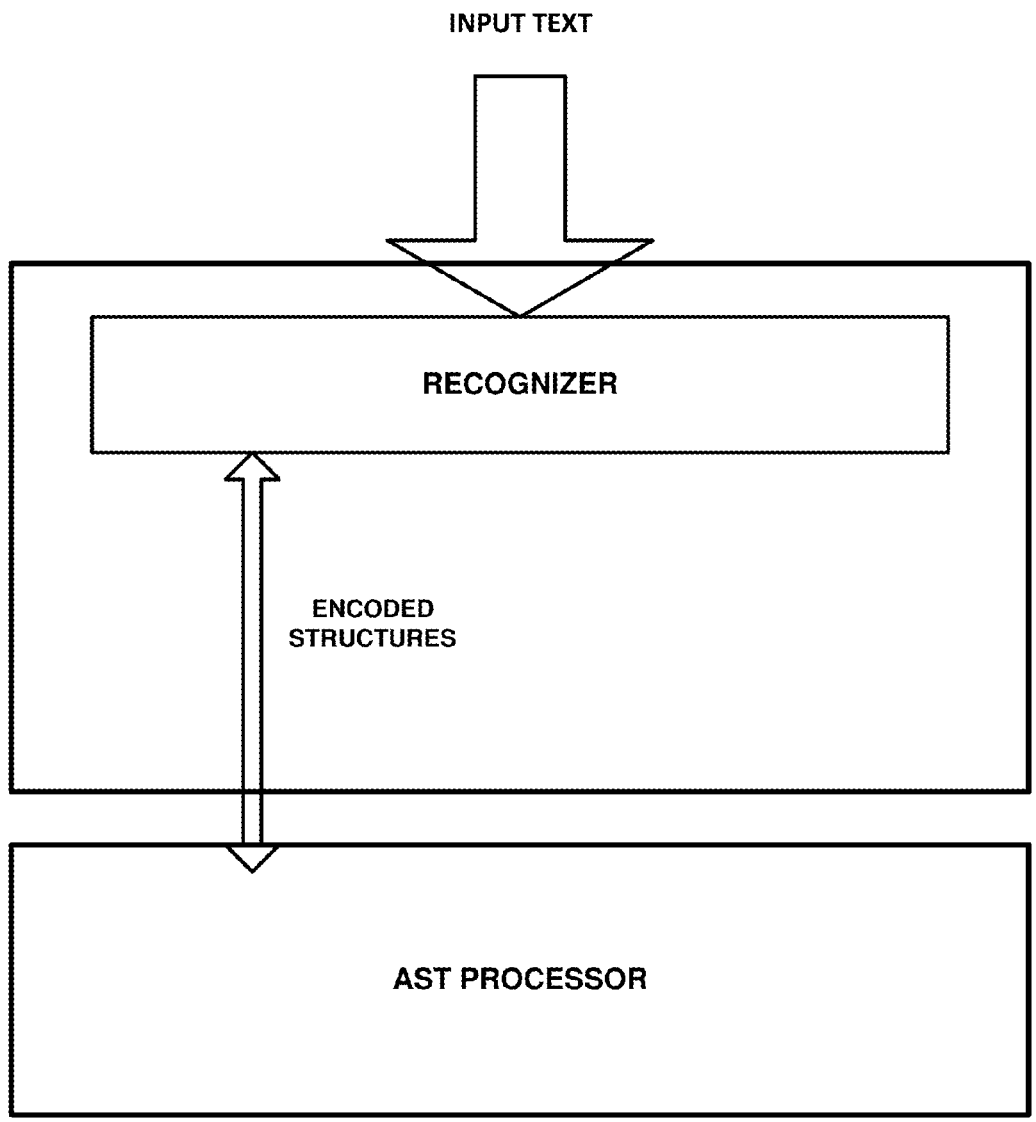
FIG. 14 illustrates a parser in accordance with the exemplary embodiment.

The mapping step introduces extra complexity to the code and diminishes the performance benefits of the LRE algorithm. The exemplary algorithm demonstrates that there is a way to preserve enough structural information during the recognition phase that allows to avoid the mapping step and to eliminate the converter module as shown in FIG. 14. The exemplary embodiment uses the LRE method in such a way that AST processor can produce its output working directly with LRE data structures.

The proposed modification of the LRE algorithm delivers a higher level of performance that the original LRE method can potentially offer. Better performance means higher throughput and shorter response time of the parser. Shorter response time results in less costs and higher customer satisfaction. Simpler code implementation also means cheaper and easier maintenance and less bugs.

Figure 15:
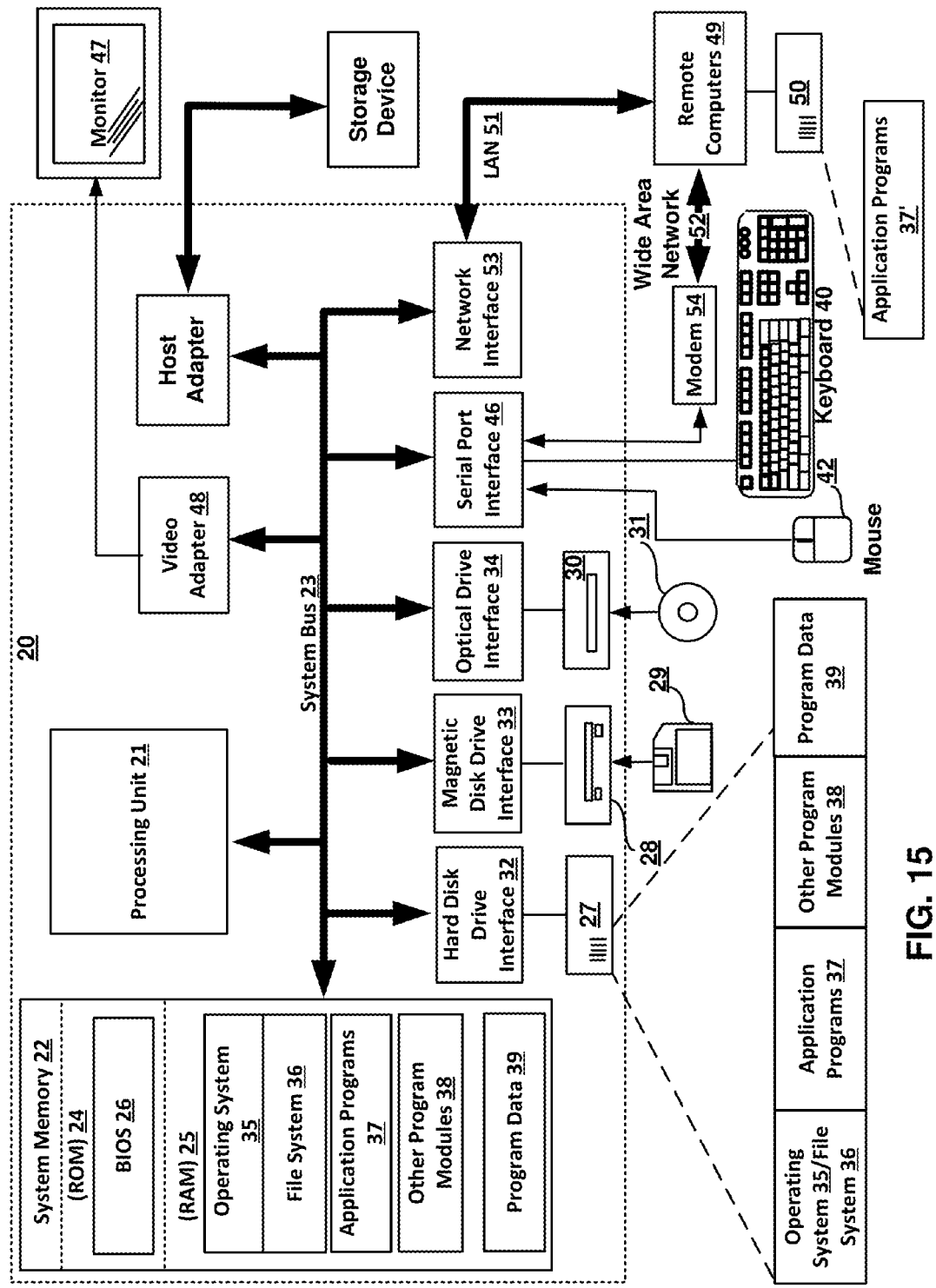
FIG. 15 illustrates a schematic diagram of an exemplary computer or server that can be used in the invention.

With reference to FIG. 15, an exemplary system for implementing the invention includes a general purpose computing device in the form of a personal computer 20 or a server or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the computer 20, such as during start-up, is stored in ROM 24. The personal computer 20 may further include a hard disk drive for reading from and writing to a hard disk 27, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably WINDOWS™ 2000). The computer 20 includes a file system 36 associated with or included within the operating system 35, such as the WINDOWS NT™ File System (NTFS), one or more application programs 37, other program modules 38 and program data 39. A user may enter commands and information into the personal computer 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48.

In addition to the monitor 47, personal computers typically include other peripheral output devices (not shown), such as speakers and printers. A data storage device, such as a hard disk drive, a magnetic tape, or other type of storage device is also connected to the system bus 23 via an interface, such as a host adapter via a connection interface, such as Integrated Drive Electronics (IDE), Advanced Technology Attachment (ATA), Ultra ATA, Small Computer System Interface (SCSI), SATA, Serial SCSI and the like.

The computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the computer 20.

The computer 20 may further include a memory storage device 50. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46.

In a networked environment, program modules depicted relative to the personal computer 20, or portions thereof, may be stored in the remote memory storage device. It will be appreciated that the network connections shown are exemplary and other means of establishing a communication link between the computers can be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

APPENDIX i 2013-01-23 03:11:48: INFO: (15567|LKPDP_8: READER_1_1): (IS|IS_OBIProd): OBINode_01: BLKR_16003: Initialization completed successfully.
2013-01-23 03:11:48: INFO: (15567|LKPDP_8: READER_1_1): (IS|IS_OBIProd): OBINode_01: BLKR_16007: Reader run started.
2013-01-23 03:11:48: INFO: (15567|LKPDP_8: READER_1_1): (IS|IS_OBIProd): OBINode_01: RR_4049: RR_4049 SQL Query issued to database: (Wed January 23 05:11:48 2013) . . .
2013-01-23 03:11:54: INFO: (15567|LKPDP_8: READER_1_1): (IS|IS_OBIProd): OBINode_01: RR_4050: RR_4050 First row returned from database to reader: (Wed January 23 05:11:54 2013)
2013-01-23 03:11:54: INFO: (15567|LKPDP_8: TRANSF_1_1): (IS|IS_OBIProd): OBINode_01: DBG_21079: DBG_21079 Creating Lookup Cache: (Wed January 23 05:11:54 2013)
2013-01-23 03:12:08: INFO: (15567|LKPDP_8: READER_1_1): (IS|IS_OBIProd): OBINode_01: BLKR_16008: Reader run completed.
2013-01-23 03:12:08: INFO: (15567|LKPDP_8: TRANSF_1_1): (IS|IS_OBIProd): OBINode_01: DBG_21682: Lookup table row count: 3191465
2013-01-23 03:12:08: INFO: (15567|LKPDP_8: TRANSF_1_1): (IS|IS_OBIProd): OBINode_01: DBG_21297: Lookup cache row count: 3191465
2013-01-23 03:12:08: INFO: (15567|LKPDP_8: TRANSF_1_1): (IS|IS_OBIProd): OBINode_01: DBG_21294: DBG_21294 Lookup cache creation completed: (Wed January 23 05:12:08 2013)
2013-01-23 03:12:08: INFO: (15567|LKPDP_8: TRANSF_1_1): (IS|IS_OBIProd): OBINode_01: CMN_1671: Created new cache files PMLKUP22336_10_0_39782L64.[dat/idx] in directory /ETL/apps/Informatica/I901/server/infa_shared/Cache for Lookup [LKP_EMP_PERF_RATING].
2013-01-23 03:12:08: INFO: (15567|LKPDP_8: TRANSF_1_1): (IS|IS_OBIProd): OBINode_01: DBG_21641: LKP_EMP_PERF_RATING: Index cache size=[11186000], Data cache size=[22372352]
2013-01-23 03:12:08: INFO: (15567|LKPDP_8: TRANSF_1_1): (IS|IS_OBIProd): OBINode_01: DBG_21216: Finished transformations for Source Qualifier [LKP_EMP_PERF_RATING{{DSQ}}].
Total errors [0]

What is claimed is:

1. A method for an abstract syntax tree (AST) builder, the method comprising:
   (a) utilizing an input string based on a document being analyzed;
   (b) launching a recognizer process configured to process the input string and to identify lexemes in the input string so as to accept or to reject grammatical structure of the input string;
   (c) generating a plurality of Left Recursive Earley (LRE) states and transitions between the LRE states by the recognizer process based on the lexemes, and entering the LRE states and the transitions into a state set table;
   (d) once the LRE states and the state set table are generated, parsing complete elements from a latest LRE state, wherein an order of elements within the state is preserved;
   (e) discarding an accepting element, when the extracted elements contain the accepting element, and when there are more lexemes left in the input string;
   (f) computing a parent-sibling relationship between a next element and an element currently located at a top of a stack;
   (g) pushing the next element onto the stack, when the stack is empty;
   (h) pushing the next element onto the stack, when the next element is a right sibling of the element currently located at a top of a stack;
   (i) repeating steps (d)-(h) until there are no lexemes left in the input string; and
   (j) generating the AST from the state set table that corresponds to the document.

2. The method of claim 1, further comprising extracting the elements from the stack and adding the elements as children to the next element, when the next element is a parent of the elements currently present in the stack.

3. The method of claim 1, wherein the last element is the accepting element.

4. The method of claim 3, wherein the accepting element is a root of the built AST.

5. The method of claim 1, wherein the AST is built in parallel with the recognition process.

6. The method of claim 5, wherein the AST is constructed by the end of the recognition process based on relationship between adjacent elements.

7. The method of claim 1, further comprising using a state number for distinguishing the LRE states.

8. The method of claim 1, further comprising using an index in parent and sibling relation for computing the parent-sibling relationship.

9. The method of claim 1, wherein the accepting element is a last element of the input string accepted by the recognizer.

10. A computer-implemented system for an abstract syntax tree (AST) builder, the system comprising:
    a processor;
    a memory couple to the processor;
    a lexical recognizer module running on the processor, the lexical recognizer module configured to process an input string that corresponds to a document and to identify lexemes in the input string so as to accept or to reject grammatical structure of the input string, and to generate a plurality of Left Recursive Earley (LRE) states based on the lexemes, and enter the LRE states and the transitions into a state set table,
    a converter couple to the lexical recognizer module, the converter configure to generate encoded structures using a conversion map;
    an AST processor coupled to the converter for receiving grammatical structures, wherein the AST processor is configured to:
      once the LRE states and the state set table are generated, parse complete elements from a latest LRE state, wherein an order of elements within the state is preserved;
      discard an accepting element, when the extracted elements contain the accepting element, and when there are more lexemes left in the input string;
      compute a parent-sibling relationship between a next element and an element currently located at a top of a stack;
      push the next element onto the stack, when the stack is empty;
      push the next element onto the stack, when the next element is a right sibling of the element currently located at a top of a stack, and
      generate the AST from the state set table that corresponds to the document.

11. The system of claim 10, wherein the AST processor configured to extract the elements from the stack and add the elements as children to the next element, when the next element is a parent of the elements currently present in the stack.

12. The system of claim 10, wherein the last element is the accepting element.

13. The system of claim 10, wherein the AST is built in parallel with the recognition process.

14. The system of claim 10, wherein the AST is constructed by the end of the recognition process based on a relationship between adjacent elements.

* * * * *